(12) United States Patent
Greer et al.

(10) Patent No.: US 9,133,318 B2
(45) Date of Patent: Sep. 15, 2015

(54) TAGGANTS FOR THERMOPLASTIC MARKING MATERIALS

(75) Inventors: Robert W. Greer, Lexington, NC (US); Simon Yakopson, Hickory, NC (US)

(73) Assignee: Flint Trading, Inc., Thimasville, NC (US)

( * ) Notice: Subject to any disclaimer, the term of this patent is extended or adjusted under 35 U.S.C. 154(b) by 710 days.

(21) Appl. No.: 12/231,405

(22) Filed: Sep. 2, 2008

(65) Prior Publication Data
US 2010/0056688 A1    Mar. 4, 2010

(51) Int. Cl.
| F21V 7/22 | (2006.01) |
| C08K 9/00 | (2006.01) |
| C08K 3/00 | (2006.01) |
| C09D 5/22 | (2006.01) |

(52) U.S. Cl.
CPC ............... *C08K 3/0008* (2013.01); *C09D 5/22* (2013.01)

(58) Field of Classification Search
USPC ........................................................ 523/172
See application file for complete search history.

(56) References Cited

U.S. PATENT DOCUMENTS

| 3,523,029 | A | * | 8/1970 | Ryan et al. ................ 106/237 |
| 3,914,468 | A | * | 10/1975 | Condon et al. ................ 427/137 |
| 4,652,395 | A | | 3/1987 | Marcina et al. |
| 5,095,210 | A | | 3/1992 | Wheatley et al. |
| 5,127,973 | A | * | 7/1992 | Sengupta et al. ............... 156/60 |
| 5,278,885 | A | | 1/1994 | Davis et al. |
| 5,390,229 | A | | 2/1995 | Grodzins |
| 5,489,639 | A | | 2/1996 | Faber et al. |
| 5,536,569 | A | | 7/1996 | Lasch et al. |
| 5,703,229 | A | | 12/1997 | Krutak et al. |
| 5,747,626 | A | * | 5/1998 | Krepski et al. .................. 528/28 |
| 5,760,394 | A | | 6/1998 | Welle |
| 5,849,590 | A | | 12/1998 | Anderson, II et al. |
| 6,005,915 | A | | 12/1999 | Hossain et al. |
| 6,007,744 | A | | 12/1999 | Nacker |
| 6,030,657 | A | | 2/2000 | Butland et al. |
| 6,157,320 | A | | 12/2000 | Yujiri et al. |
| 6,221,279 | B1 | | 4/2001 | Strand et al. |
| 6,432,715 | B1 | | 8/2002 | Nelson et al. |
| 7,157,140 | B1 | | 1/2007 | Hoppe |
| 7,169,471 | B1 | | 1/2007 | Dreher et al. |
| 7,189,025 | B1 | | 3/2007 | Greer et al. |
| 2003/0012599 | A1 | * | 1/2003 | Wallgren et al. ................. 404/14 |
| 2005/0277710 | A1 | | 12/2005 | Joyce et al. |
| 2007/0110960 | A1 | * | 5/2007 | Frey et al. ...................... 428/143 |
| 2009/0084981 | A1 | * | 4/2009 | Bown et al. ................. 250/459.1 |

FOREIGN PATENT DOCUMENTS

WO    WO 2006119561 A1 * 11/2006

OTHER PUBLICATIONS

OSHA. "Occupational Safety and Health Guideline for Zinc Oxide" [online], Sep. 1996 [retrieved Mar. 20, 2009], http://www.osha.gov/SLTC/healthguidelines/zincoxide/recognition.html.*

* cited by examiner

*Primary Examiner* — Michael L Leonard
(74) *Attorney, Agent, or Firm* — Guerry L. Grune; ePatent Manager

(57) ABSTRACT

Disclosed is a taggant composition identifying a preformed thermoplastic pavement marking having chemical elements wherein the taggant concentration must be the greater of two times the base concentration of the taggant composition in the preformed thermoplastic pavement marking or six times the standard error of the measurement equipment error.

10 Claims, No Drawings

TAGGANTS FOR THERMOPLASTIC MARKING MATERIALS

FIELD OF DISCLOSURE

The disclosure relates to preformed thermoplastic pavement marking materials (PTPMM) used in traffic control and direction, tactile detectable warning panels, decorative pavement marking, horizontal signage and logos. More specifically the disclosure provides formulations for tagging preformed thermoplastic pavement marking materials to determine manufacturer, date of manufacture and to track reliability.

BACKGROUND OF DISCLOSURE

There has been significant interest in methods for identifying and verifying various articles or products such as explosives, ammunition, paint, petroleum products, and documents. Known methods used to identify and verify generally involve adding and detecting materials like code-bearing microparticles, bulk chemical substances, and radioactive substances. Other methods used for identifying and verifying articles include those described in U.S. Pat. Nos. 6,030,657, 6,007,744, 6,005,915, 5,849,590, 5,760,394, 5,677,187, 5,474,937, 5,301,044, 5,208,630, 5,057,268, 4,862,143, 4,390,452, 4,363,965, and 4,045,676, as well as European Patent Application Nos. 0911626 and 0911627, the disclosures of which are incorporated herein by reference.

It is also known to apply materials to articles in order to track, for example, point of origin, authenticity, and their distribution. In one method inks, which are transparent in visible light, are sometimes applied to materials and the presence (or absence) of the ink is revealed by ultraviolet or infrared fluorescence. Other methods include implanting microscopic additives which can be detected optically. However, detecting these materials is primarily based on optical or photometric measurements.

Unfortunately, many of the apparatus and methods for identifying and verifying articles using such materials (called taggants) are unsatisfactory for several reasons. First, verification of presence or absence of the taggant is often difficult and time-consuming. In many instances, a sample of the article must be sent to an off-site laboratory for analysis. In other instances, the apparatus are often expensive, large, and difficult to operate. In yet other instances, the taggant used is radioactive, causing serious health concerns.

Preformed thermoplastic traffic marking materials for use on pavement, such as road surfaces, are important elements in modern traffic direction and control. They have been used, for example, in the form of arrows and lane dividers, as parking lot striping, to designate special areas, e.g., handicapped parking, and the like and are typically applied directly to the pavement surface. Application procedure consists of marking of the pavement, placing preformed signs on the surface and melting of the materials with propane torch or other heaters and providing a means for a strong bond between materials and pavement.

These materials must also follow strict regulation standards defining colors, content of polymer binder, glass beads, titanium dioxide, and mineral fillers. In addition these materials must comply with the requirements regarding leaching of toxic substances.

Preformed thermoplastic traffic marking materials are subject to a variety of factors that affect their performance and adherence to the pavement. Weathering, i.e., rain or snow, and high and low ambient temperature effects, high UV radiation from sun, can melt, crack or decompose the traffic marking material rendering it ineffective for the intended purposes.

Application and post-application procedures are required to provide sufficient durability. Uneven heating during application may result in insufficient penetration of melted material in the surface substrate and, thus, a weak bond between material and surface. These poorly heated areas are subject to cracks and material loss. Variation in production conditions and properties of the materials can also affect the melt characteristics of the materials and their adherence to the pavement surface.

Preformed thermoplastic pavement marking usually have a relatively long warranty of up to 5 years and more. When signs made of preformed thermoplastic materials fail they need to be replaced under the specified warranty to provide reliable traffic direction or control. Initial application to the pavement is usually provided by independent contractors selecting their materials from the list of approved suppliers. Since all materials must follow the same standards for color and reflectivity, once the pavement marking materials are applied to the pavement, it is practically impossible to determine the materials or manufacturer. Record keeping by the contractor may be marginal at best or partial wherein two or more vendor's products are used in a single project.

It is therefore important, under warranty claims, for the vendor of a pavement marking to be able to positively identify their product with a unique taggant after application and within the warranty period in cases of unacceptable wear or failure. Additionally, it is important to be able to determine production lots during root cause analysis of the problem.

RELEVANT ART

U.S. Pat. No. 7,189,025 to Greer, et. al., and assigned to Flint Trading Inc., describes a pavement warning assembly for installation on a rigid substrate comprising a web, a cover, positioned over the web, an adhesive sheet attached to the web, and a primer, positioned on the substrate. The web has a plurality of projections, linear connectors, joined at each end to different ones of the projections. The cover defines a plurality of apertures for receiving a different one of the projections whereby the adhesive sheet contacts the primer upon installation of the warning assembly on the substrate.

U.S. Pat. No. 5,536,569 to Lasch, et. al., and assigned to 3M, describes a conformable pavement marking sheet having a top surface useful as a marking indicium and a bottom surface. The marking sheet has a conformance layer having a thickness of 75 to 1250 micrometers of a composite material with 50 to 85 volume percent of a ductile thermoplastic polymer selected from the group consisting of polyethylene, polypropylene, polybutylene, ethylene copolymers, polyvinylidene fluoride, polytetrafluoroethylene, polyvinyl polymers, polyamides, and polyurethanes and 15 to 50 volume percent mineral particulate having a mean particle size of at least 1 micrometer. The conformance layer requires, when tested at 25° C. using standard tensile strength apparatus, not more than 35 Newtons force per centimeter of width to deform a sample to 115% of original sample length when tested at a strain rate of 0.05 sec-1; and which further comprises a top layer distinct from the conformance layer, 80-250 micrometers thick, having a thermoplastic polyolefin.

U.S. Pat. No. 7,169,471, to Dreher, et. al., and assigned to EMD Chemicals, Inc., describes a laser marking additive, comprising: a plurality of particles having a thickness less than 100 nm and all dimensions less than 25 microns of at least one compound of the formula: MOCl where M is, independently, As, Sb, or Bi; or a compound of formula $BiONO_3$, $Bi_2O_2CO_3$, BiOOH, BiOF, BiOBr, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCo_3$; wherein a lacquer drawdown comprising the additive has a luster index of greater than 50%.

U.S. Pat. No. 5,703,229, to Krutak, et. al., and assigned to Eastman Kodak., describes a compound of a Formulae II: wherein Pc represents the phthalocyanine moiety of Formula IIa, covalently bonded to AlOR5, wherein R5 is selected from aryl groups substituted by at least one polyester reactive group selected from hydroxy, carboxy or an ester radical having the formulae —OCOR14, —OCO$_2$R14, —OCONHR14 or —CO$_2$R14, wherein R14 is selected from unsubstituted or substituted alkyl, cycloalkyl or aryl radicals; X is selected from oxygen, sulfur, or N—R10, wherein R10 is hydrogen, cycloalkyl, alkyl, acyl, alkylsulfonyl, or aryl or R10 and R taken together to form a six-membered saturated or unsaturated heterocyclic ring with the nitrogen atom to which they are attached; Y is selected from alkyl, aryl, heteroaryl, halogen or hydrogen; R is selected from hydrogen, unsubstituted or C3-C8 cycloalkyl, aryl, heteroaryl, alkylene —(X—R)m is one or more groups selected from alkylsulfonylamino, arylsulfonylamino, or a group selected from the formulae —X(C2H4O)z R, wherein R7, R8, and R9 are independently selected from alkyl, phenyl or phenyl substituted with lower alkyl, lower alkoxy or halogen; wherein R is as defined above; Z is an integer of from 1-4; two —(X—R)m groups can be taken together to form divalent substituents of the formula wherein each X1 is independently selected from —O—, —S—, or —N—R10 and A is selected from ethylene; propylene; trimethylene; and said groups substituted with C1-C4 alkyl, C1-C4 alkoxy, aryl and cycloalkyl; or 1,2-phenylene and 1,2-phenylene containing 1-3 substituents selected from C1-C4 alkyl, C1-C4 alkoxy or halogen; n is an integer from 0-16; m is an integer from 0-16; provided that the sums of n+m is 16.

U.S. Pat. No. 6,157,320, to Yujiri, et. al., and assigned to TRW, Inc., describes a system for communicating to a vehicle operator operating a vehicle upon a roadway in a geographic region in which the roadway is exposed to the sky of the presence nearby of a roadway marker strip on said roadway, having an MMW radiometer means carried by a vehicle for detecting MMW radiometric energy. The MMW radiometer includes an antenna oriented forwardly and downwardly at a steep angle toward the roadway; and a roadway marker having an MMW radiometric energy reflecting material. The roadway marker forms a strip adhered to the roadway and essentially flush therewith. The roadway marker has a MMW radiometric temperature characteristic distinct from and provides detectable MMW radiometric contrast with the MMW radiometric temperature characteristic of the roadway.

U.S. Pat. No. 6,221,279, to Strand, et. al., and assigned to Isotag Technology, Inc., describes a fluorescent particulate marking composition having a crystalline thermoplastic polyester resin having residues of at least one dicarboxylic acid and having an intrinsic vicosity (IV) of less than about 0.37; and a near-infrared fluorescing compound having a fluorescence between about 650 nm to about 2500 nm associated with the crystalline thermoplastic polyester in copolymerized form, wherein the marking composition has a mean particle size in the range of 0.1 to about 10 microns, and the near-infrared fluorescing compound is present in the marking composition in an amount in the range of from about 10 ppm to 5,000 ppm and is invisible to the unaided eye.

U.S. Pat. No. 5,489,639, to Faber, et. al., and assigned to General Electric, describes a laser markable thermoplastic composition having at least one thermoplastic resin composition suitable for laser marking and at least one copper salt selected from the group consisting of copper phosphate, copper sulfate, and copper thiocyanate. The copper salt is present in an amount sufficient to cause the laser markable thermoplastic con, position to absorb a laser light outside the visible spectrum such that the portion of the composition which absorbs the laser light has a visibly distinct and separately identifiable color.

U.S. Pat. No. 5,095,210, to Wheatley, et. al., and assigned to The Dow Chemical Co., describes a process for determining the integrity or authenticity of an item or its conformance to an original state, including the steps of associating a multilayer film indicator with the item, wherein the multilayer film indicator has a laminate of closely adjacent layers of two or more diverse thermoplastic materials of differing refractive indices which has an identifiable original quality arising from the optical interactions of the layers. The quality of the item is not readily visible to the naked eye therefore measuring the original quality, measuring the laminate a second time, and comparing the original and the second measurements to ascertain the presence or absence of the identifiable original quality.

U.S. Pat. No. 5,390,229, to Grodzins, Lee, and unassigned, describes a device for measuring the areal density, in mass per unit area, of a target element having L electrons, the target element being near the surface of a substrate, the target element being covered by layers of covering material that do not contain the target element, having a source means of photons, with energies at least greater than the L binding energy of the target element, that will induce or fluoresce $L\alpha$ and $L\beta$ x-rays from the target, a detector means to measure the intensity distribution of the spectrum of photons emitted from the surface containing the target element, the detector means having sufficient energy resolution to separately measure the $L\alpha$ and $L\beta$ x-rays emitted from the target element, a radiation shield means to isolate the detector from direct radiations from the source of photons, an output means to record and display the deduced value of the areal density of the target element, the device including an electronic/computer means for determining the areal density of the target element from the measured intensities of the $L\alpha$ and $L\beta$ x-rays wherein mZ is the areal density of the target element, mS is the areal density of a standard of known areal density of the target element, IL.sbsb.$\alpha$ and IL.sbsb.$\beta$ are the measured intensities of the $L\alpha$ and $L\beta$ x-rays emitted by the target element, IL.sbsb.$\alpha$S and IL.sbsb.$\beta$S are the measured intensities of the $L\alpha$ and $L\beta$ x-rays emitted by the standard of known areal density of the target element, R1 is the ratio of mass attenuation coefficients for the $L\alpha$ to the $L\beta$ x-rays and is effectively the same value for all materials, and R2 is the ratio of the mass attenuation coefficients for the initiating radiation to the $L\beta$ radiation and is effectively the same value for all materials.

U.S. Pat. No. 5,278,885, to Davis, et. al., and assigned to Bridgestone Corp, describes a method of analyzing an identifiable rubber article having a rubber-based material and an X-ray fluorescable material, using the steps of irradiating the material with a fluorescence-inducing wavelength and analyzing the fluorescence emission data of the material.

U.S. Pat. No. 4,652,395, to Marcina, et. al., and assigned to The W. W. Henry Co., describes a film-forming, viscous composition having a liquid diluent containing from 30 to 90 parts by weight of a film-forming resin in which is dispersed solid, discrete fluorescent taggant particles in an amount from 0.1 oz. to 5 pounds per gallon of the composition. The particles are insoluble in the diluent and being formed of fluorescent dyed powder dispersed in a solid transparent plastic binder resin and being readily discernible when the film is exposed to ultraviolet light.

U.S. Pat. No. 6,432,715, to Nelson, et. al., and assigned to IsoTag Technology, Inc., describes an encoded microparticle comprising at least three layers made distinguishable from each other by the incorporation of different dyes and/or pigments in the layers, at least one of the layers carrying at least two dyes and/or pigments further distinguishable from each other, at least one of the at least two dyes and/or pigments having a near infrared fluorophore.

U.S. Pat. No. 7,157,140, to Hoppe, Karl M., and assigned to RTP Company, describes a malleable thermoplastic composite having a base resin with a thermoplastic having a melt flow index of greater than about 1000 dg/min pursuant to ASTM D1238-98; and a particulate material having a density greater than about 2.5 g/cm3 blended with the thermoplastic polymer at a concentration of between 60 percent by weight and about 99 percent by weight of the composite material and having an aspect ratio of less than about 50.

U.S. Pat. No. 6,030,657, to Butland, et. al., and assigned to DNA Technologies, Inc., describes a method for labeling an object for its identification, which contains the steps of encapsulating with an encapsulant a biologic marker labeled with an agent that emits selected detectable wavelengths of energy when exposed to infrared radiation (IR) and associating the labeled marker with the object, whereby, the object to be identified can be exposed to IR and emitted select wavelengths of energy from the agent are detected.

U.S. Pat. No. 6,007,744, to Nacker, Wayne Earl, and assigned to Morton International, Inc., describes a method of tagging a liquid product and identifying the tagged product providing a marker compound having an identifying chemical moiety having at least one strong absorption peak within the UV-visible-IR spectra and at least one polymerizable chemical moiety, tagging a liquid with the marker compound, in a specimen of the liquid, polymerizing the marker compound, and identifying the marker compound in the polymerized product according to the absorption peak of the identifying chemical moiety.

U.S. Pat. No. 6,005,915, to Hossain, et. al., and assigned to Advanced Micro Devices Inc., describes an apparatus for determining the roughness of a target surface having an X-ray source adapted to produce a plurality of primary X-ray photons, wherein the plurality of primary X-ray photons forms a primary X-ray beam, and wherein the primary X-ray beam is incident upon the target surface. There is an X-ray detector positioned to receive primary X-ray photons scattered by the target surface, wherein the X-ray detector is adapted to produce a detector output signal proportional to energy levels of received X-ray photons; and a computer system coupled to receive the detector output signal and adapted to determine the roughness of the target surface based upon the number of primary X-ray photons scattered by the target surface and received by the X-ray detector within a predetermined exposure time.

U.S. Pat. No. 5,849,590, to Anderson ll, et. al., and unassigned, describes a method for forming a tagged chemical composition providing elemental analysis results for a chemical composition indicating concentrations of rare elements in the chemical composition and adding a combination of at least two rare elements to the chemical composition to form a tagged chemical composition. Each of the at least two rare elements is foreign to the chemical composition and the combination of the at least two rare elements is added to the chemical composition by solution impregnation of the at least two rare elements from homogenous solution so that the combination of the at least two rare elements is added to the chemical composition as a dispersion at the atomic level. The combination of the at least two rare elements is added to the chemical composition in amounts sufficient so that the combination of the at least two rare elements added to the chemical composition can be subsequently determined by an elemental analysis of the tagged chemical composition.

U.S. Pat. No. 5,760,394, to Welle, Richard P., and unassigned, describes a method of tagging a substance for identification by isolating and assigning an identification code to the substance to be tagged and adding to the substance a taggant having of at least two elements. Each element has at least two stable isotopes in a selected artificial isotopic abundance ratio wherein the abundance ratio is unchanged by chemical reactions and maintaining a tagging record showing the correlation between the selected isotopic abundance ratio of each element in the taggant and the assigned identification code of the substance. The isotopic abundance ratio of each element of the taggant in the substance is measured and the results of the measurement are compared with the tagging record to identify the assigned identification code of the substance.

U.S. Pat. No. 5,677,187, to Anderson ll, et. al., and unassigned, describes a chemical composition which contains a tagging agent uniformly dispersed therein at the atomic level containing at least two different rare elements of the periodic table which are foreign to the chemical composition and are present in the chemical composition in a detectable amount and at natural isotopic distribution.

U.S. Pat. No. 5,474,937, to Anderson ll, et. al., and assigned to Isotag LLC, describes a method for identifying the origin of a chemical fluid at a receipt location which introduces into the chemical fluid at the origin at least one non-radioactive isotope of a chemical substance which will disperse in the chemical fluid and analyzing the chemical fluid at the receipt location for the presence of at least one non-radioactive isotope, wherein the chemical substance comprises an organometallic material.

U.S. Pat. No. 5,301,044, to Wright, Joseph D., and assigned to Xerox Corp., describes a method of producing an image, providing image wise applying at least one marking material containing a taggant to a substrate by a mechanical or electromechanical printing process to form the image on the substrate.

U.S. Pat. No. 5,208,630, to Goodbrand, et. al., and assigned to Xerox Corp., describes a process for the authentication of documents which provides for generating developed documents in an electrophotographic apparatus, or in a laser printer, with an encapsulated toner having of a core of polymer, pigment, and an infrared absorbing component, and thereover a polymeric shell, and subjecting the documents to an infrared reader whereby the infrared absorbing component is detected spectroscopically.

U.S. Pat. No. 5,057,268, to Muller, Richard A., and assigned to The Mitre Corporation, describes a note of monetary currency comprising a sheet formed principally of cellulose that is deuterated to a level that results in at least 0.1 mg of deuterium for each one dollar (U.S.) in value of the note.

U.S. Pat. No. 4,862,143, to Hirschfield, et. al., and assigned to Isomed, Inc., describes a counterfeit detecting apparatus for detecting the authenticity of an article having a label containing an isotope of a chemical element having a housing, a source of gamma radiation positioned in the housing, the source being subject to the Mossbauer effect when employed with a particular isotope in the label, a gamma radiation detector means positioned in the housing for detecting radiation from the source, a receiving means in the housing for enabling at least a portion of the article to be inserted therein such that the label is positioned between the source and the detector means, a vibrating means for vibrating the source such that the frequency of the gamma radiation therefrom is shifted and a calculating means coupled to the detector means for calculating the ratio of the number of gamma rays counted by the detector means during a predetermined period of time when the article is not positioned by the receiving means (NO) to the number of gamma rays counted by the detector means, during a period of time equal to the predetermined period, when the article is positioned by the receiving means (NR), and for calculating the ratio of the number of gamma rays counted by the detector means, during the predetermined period of time when the article is not positioned by the receiving means (NO), to the number of gamma rays counted during a period of time equal to the predetermined period when the source is vibrated by the vibrating means (NE) and for calculating the ratio NR/NE and an output means for providing an output indicating whether NR/NE is within a predetermined range.

U.S. Pat. No. 4,390,452, to Stevens, Edward J., and assigned to 3M, describes a batch of organic microparticles which are uniformly encoded for retrospective identification, each of the same thickness not significantly exceeding 500 micrometers and having two surfaces which are generally flat and parallel to each other across its broadest dimension, the broadest dimension of most of the microparticles being no greater than 1000 micrometers but greater than the thickness, the improvement being at least one of the flat surfaces of each microparticle bears identifying indicia selected from alphanumerics and symbols which provide a repetitive code that is randomly located with respect to the edges of the microparticle, can be visually interpreted under magnification and repeats in any direction within a distance less than the broadest dimension so that examination of a typical microparticle of average size should reveal the code.

U.S. Pat. No. 4,363,965, to Soberman, et. al., and assigned to The Franklin Institute, describes a method for indicating the presence of a non-radioactive, inert tagging substance in a carrier material having a Mossbauer isotope. The method has the steps of providing a nuclear detector means including a Mossbauer isotope-containing detecting substance, which is identical to the tagging substance, and sensing means responsive to the presence of the tagging substance in the carrier material, provided that the Mossbauer isotope of the tagging substance is in a state of resonance excitation and causes excitation of the Mossbauer isotope of the detecting substance. The sensing means is operatively associated with an indicator means for indicating whether or not the sensing means has sensed radiation emitted from the excited Mossbauer isotope of the detecting substance. The carrier material is exposed to the detector in position to activate the sensing means and the carrier material is irradiated with radiation causing resonance excitation of the Mossbauer isotope of the tagging substance. If present in the carrier material the presence, or absence, of the tagging substance in the carrier material is indicated.

U.S. Pat. No. 4,045,676, to Rolle, Rainer, and assigned to Ortec Inc., describes a method of determining the concentration of an element in a sample which has a rough surface having the steps of irradiating at least one calibration sample of known concentration of the element to excite radiation from the element in a known energy band characteristic of the element and
  i. measuring such radiation to establish a relationship between the measured characteristic radiation and the concentration of the element, and
  ii. measuring under substantially the same geometrical conditions of irradiation and detection as in the first step i.

The rate of emission of detected radiation in a reference energy range, the reference energy range being relatively wide compared to the characteristic band such that the ratio of the characteristic radiation to reference range radiation is small, such rate establishing a reference value for that range and irradiating the rough surfaced sample to be analyzed,
  i. first measuring the rate of emission of detected radiation from that sample in the reference energy range, while varying the geometrical conditions of irradiation and detection until the measured rate of detected radiation in the reference energy range is equal to the established reference value, and
  ii. ii. then, under the same geometrical conditions for which the measured rate of detected radiation in the reference energy range equaled the established reference value in the second step i., measuring the excited radiation of that sample in only the characteristic band, and from such measurement and the established relationship, determining the concentration of the element in that sample.

U.S. Publication No. US20050277710A1, to Joyce, et. al., and assigned to General Electric, describes a tagged resin having a thermoplastic material and a marked particle, wherein the marked particle is a covert identifier, wherein the particle has a median length of about 20 micrometers to about 350 micrometers, as measured along a major axis, and has an aspect ratio of about 1:1 to about 10:1.

PCT. Publication No. WO2002/085543, to Shchiegolikhin, et. al., and assigned to Quantag Systems, Inc, describes an organic or organoelement, linear or branched, monomeric or polymeric composition of matter having a Raman active compound in the form of particles whose maximum dimension is 50 mm, wherein the Raman-active compound is applied to a substrate or compatibilized with a substrate. The Raman-active compound has a characteristic that, when the Raman active compound is applied to a substrate and then exposed to a laser light wavelength which is batochromically shifted well beyond a spectral region of maximum absorbance of the Raman active compound, at any incident intensity of the laser light higher than 1.0 mW but lower than that capable of inducing photothermal degradation of the Raman active compound or the substrate. Raman scattering can be detected in a 2300 1900 cm' Reman shifts region at a level of at least 0.001 fW above an intensity of a 5 background signal of the substrate.

PCT. Publication No. WO06096694A3, to Hoppe, Karl M., and assigned to RTP Company, describes a thermoplastic resin blend having a thermoplastic resin selected from the group consisting of polypropylene, low density polyethylene, ethylene vinyl acetate copolymer, ethylene acrylic acid copolymer, and blends thereof, having a melt flow above about 300 gIlO mm as measured by ASTM D-1238-95, wherein the melt flow of polypropylene is measured at 230° C. and with a weight of 2.16 kg, the melt flow of low density polyethylene is measured at 190° C. and with a weight of 2.16 kg, the melt flow of ethylene vinyl acetate copolymer is measured at 125° C. and with a weight of 0.325 kg, and the melt flow of ethylene acrylic acid copolymer is measured at 125° C. with a weight of 0.325 kg; and long fibers blended into the thermoplastic resin, wherein the long fibers are present in a concentration of between about 8 percent and about 75 percent by volume.

PCT. Publication No. WO05012408A3, to Hoppe, Karl M., and assigned to RTP Company, describes a malleable thermoplastic composite having a base resin comprising a low molecular weight thermoplastic having a melt flow index of greater than about 1000 dg/min pursuant to ASTM D1238-98; and a particulate material having a density greater than about 2.5 g/cm3 blended with the first thermoplastic polymer at a concentration of between about 60 percent by weight and about 99 percent by weight of the composite material and having an aspect ratio of less than about 50.

European. Publication No. EP0911626, to Thebock, et. al., and assigned to The Wahoo Trust, describes a method of identification of an article including the steps of introducing or incorporating at least two detectable substances having characteristic spectra which can be identified and/or quantified according to their chemical nature and/or their ratios and/or relative concentrations by suitable spectrographic means, into an article or a material for coating of the article, in a predetermined ratio and/or concentrations.

European. Publication No. EP0911627, to Thebock, Peter, and assigned to The Wahoo Trust, describes a method of analysing an element or compound in a sample includes the step of energising the pure element anode or compound anode with a pulsed e-beam and obtaining a spectrum of the produced X-ray beam, and then energising the sample to be analysed with pulsed x-ray beam obtaining a spectrum of the produced X-ray beam and superimposing it between the zero line and the spectrum of the pure element or compound, and comparing the spectra for qualitative similarity, and, if similar, determining the relative concentration of the element or compound in the sample by direct measurement on the superimposed spectra, calibrating said data by subtracting the resolution/energy response function used as a zero line of the pure element or compound.

SUMMARY OF THE DISCLOSURE

Disclosed is a preformed thermoplastic pavement marking material (PTPMM) having meltable polymers with a specified amount of a selected taggant compound derived from chemical elements with an atomic number from 20 to 82 in concentrations from 200-5000 ppm based on the selected taggant elements.

In another embodiment the (PTPMM) includes plasticizers, pigments, mineral fillers such that part of the filler composition is a selected taggant used for identification such as $BaSO_4$, $ZnO$, $Cu(OH)_2$ or mix of $CuCO_3 \times Cu(OH)_2$ and/or any or all of the taggants.

In another embodiment the concentration of the selected taggant added is based on the concentration of the taggant element in the base PTPMM composition wherein the addition of the selected taggant element is at least twice (2×) that of the base concentration while this concentration difference between the selected taggant and the base concentration must be at least 6 times higher than the standard error of the test method.

In another embodiment of the disclosure the selected taggant can be quantitatively identified in on-site testing by one or more simple non-destructive analytical techniques, such as X-ray flouroscopy (XRF), providing identification of the PTPMM by means of the concentration of the selected taggant.

Another embodiment of the disclosure is the use of a compound having elements with an atomic number from 20 to 82 and with solubility below 0.0015 g/L in water at 25 C.

In yet another embodiment of the disclosure the compound is insoluble in the pH range from 4.5 to 9.

As another embodiment of the disclosure the compound may be identified to be "as made" PTPMM to distinguish from later application of the PTPMM to a pavement surface.

Another embodiment of the disclosure is the use of a compound that is non-toxic and does not decompose, separate or leach out while in use, or when exposed to UV or flame or solvents. Therefore this would eliminate the use of environmentally hazardous chemicals or compounds.

In another embodiment of the disclosure the PTPMM includes specified colors as well as especially high whiteness incorporated into the materials of choice.

In another embodiment of the disclosure the taggant is identifiable when present in the mix of many different elements and compounds such as polymer binders and plasticizers, glass beads, mineral additives, such as calcium carbonate, feldspar, silica, etc. White and light colored materials contain significant amount of titanium dioxide, up to 10% for white materials as required by standards used for making of preformed thermoplastic pavement marking materials. Taggants must also be identifiable even in the presence of this excessive compound loading.

In another embodiment of the disclosure the taggant is uniformly distributed within the PTPMM.

In another embodiment of the disclosure the taggant is 0.005-0.1 weight % of microparticles and may be impregnated with fluorescent and/or phosphorescent colorants.

In yet another embodiment of the disclosure the taggant is made of non-meltable materials with a particle size from 10 to 100 microns; the microparticles are uniformly distributed through the volume of the material so that every cross-sectional layer of 90-mil (0.0090") material that is 2-5 cm long contains at least 3 particles that are visible under light magnification during and/or after illumination with UV light.

In another embodiment of the disclosure the taggant includes particles that are impregnated with different colorants allowing for segregation of materials produced at different times or with different formulations such that these colors can be used individually or in blends, providing a more precise information regarding these materials.

In another embodiment of the disclosure, the taggant microparticles are composed of melamine-sulphonamide-formaldehyde copolymer or phenol-formaldehyde resins.

DETAILED DESCRIPTION

Disclosed is a preformed thermoplastic pavement marking material (PTPMM). The composition of the PTPMM includes thermoplastics and other polymers that form a melt together with a natural amount of a selected taggant composition. The specified amount of a selected taggant composition is derived from the following set of conditions:

If there is a taggant element in the composition, then the specified increase of the concentration of the taggant element is an identifier, and it can be calculated using the inequalities describing two conditions of the method:

$$AA >= 2BC \tag{a}$$

$$AA - BC >= 6SE \tag{b}$$

Where:
AA—added amount of the element
BC—base concentration of the element in the material
SE—standard error of the test method $$\text{Solving}(b) \text{ for } AA, \text{ we get } AA >= 6SE + BC \tag{c}$$

The larger of (a) and (c) will determine the required concentration of the taggant element.

The selected taggant chemical elements have an atomic number from 20 to 82 in concentrations from 200-5000 ppm based on the selected taggant elements.

Examples of possible selected taggants and taggant concentrations are given below.

Example 1

The concentration of Barium (Ba) in a preformed thermoplastic pavement marker was measured to be as high as 800 ppm. Standard error for Ba analysis with the XRF method using a Niton XL3t 600 Analyzer is 30-40 ppm (for certain test conditions). Thus the difference between the taggant and the base concentrations is at least 240 ppm. (i.e.: 6×the standard error of 40 ppm), and added amount of the taggant should be 240 ppm+800 ppm=1040 ppm [Formula (c)]. Another requirement is that the taggant concentration should be at least 2 times higher than the base concentration. Therefore the taggant addition is at least 1600 ppm with respect to the base PTPM. In the case of adding a $BaSO_4$ taggant to the base material, the Ba concentration is about 58.8% in the $BaSO_4$ salt. An additional 2700 ppm (0.27%) of the $BaSO_4$ taggant is added to the material.

Example 2

The concentration of Zinc (Zn) in a preformed thermoplastic pavement marker was found to be from below detectable limits to above 700 ppm. Standard error for Zn analysis with the XRF method using a Niton XL3t 600 Analyzer is up to 40 ppm (for certain test conditions).

Thus, according to formula (c) addition of Zn should be 700+240=940 ppm. According to formula (a), the taggant addition should be at least 1400 ppm. Therefore, one has to add 1400 ppm. Considering the concentration of Zn in ZnO to be 80%, the additional required ZnO is 1750 ppm (0.175%) required to be added to the material.

Example 3

The concentration of copper (Cu) in a preformed thermoplastic pavement marker was found from below detection to above 50 ppm. Standard error for Cu analysis with the XRF method using a Niton XL3t 600 Analyzer is up to 25 ppm (for certain test conditions). The Cu taggant addition at 2× concentration would be 100 ppm. However, 100 ppm is less than the required 6× (150 ppm) standard error of the instrumentation plus 1× base concentration (50 ppm) to the total of 200 ppm, therefore the higher of the 2 values is used as the taggant concentration. $Cu(OH)_2$ contains 65% Cu, and therefore a 307 ppm concentration is added to the material.

There are additional limiting factors that require additional considerations for preparing the proper taggant concentrations including low solubility of the taggant in different mediums including water and light stability.

Once the PTPMM is manufactured, the selected taggant composition is analyzed for concentration of either the selected taggant or a combination of the selected taggants and is recorded for later identification. Should the PTPMM exhibit premature failure within the warranty period. X-ray fluoroscopy may include the use of methods such as Niton XL3t 600 equipment to determine taggant concentrations.

To ensure the selected taggant tracer microparticles are evenly distributed in the material, they are normally added at the beginning of mixing and subjected to 4 to 5 hours at 160° C.-200° C.

The invention claimed is:

1. A preformed thermoplastic pavement marking material comprising a taggant composition wherein said taggant composition is a carrier consisting essentially of chemical elements with an atomic number between 29 and 60 and wherein said taggant composition includes a taggant concentration of said chemical elements that is within the range of 200 ppm to 5000 ppm and such that said taggant composition is identifiable before, during or after application of said preformed thermoplastic pavement marking material to a pavement surface and wherein said pavement marking material is selected from a taggant composition wherein taggant microparticles of said taggant composition consist of the group selected from combined with melamine-sulphonamide-formaldehyde copolymer and phenol-formaldehyde resins and said taggant composition is further selected from the group consisting of; plasticizers, glass beads, calcium carbonate, feldspar, and silica, and wherein said taggant concentration is greater than the standard error of the measurement equipment required to determine said taggant concentration of said chemical elements.

2. The preformed thermoplastic pavement marking material of claim 1, wherein said taggant composition is selected from the group of mineral fillers consisting of: BaSO4, $Cu(OH)_2$, and a mix of $CuCO_3$ and $Cu(OH)_2$.

3. The preformed thermoplastic pavement marking material of claim 1, wherein said taggant concentration of said chemical elements is quantitatively identified by one or more non-destructive analytical techniques.

4. The preformed thermoplastic pavement marking material of claim 1, wherein the solubility of said taggant composition is less than 0.0015 g/L, in water at 25 degrees Centigrade.

5. The preformed thermoplastic pavement marking material of claim 1, wherein said taggant composition is soluble in water in a pH range of between 4.5 and 9.0.

6. The preformed thermoplastic pavement marking material of claim 1, wherein said taggant composition and the concentration of said chemical elements within said taggant composition is identifiable in said mix.

7. The preformed thermoplastic pavement marking material of claim 1, wherein said taggant composition comprises between 0.005 and 0.1 weight percent microparticles impregnated with fluorescent and/or phosphorescent colorant.

8. The preformed thermoplastic pavement marking material of claim 1, wherein said taggant composition comprises materials without distinct melting points including particles with a particle size ranging from 10 to 100 microns and
   wherein said taggant composition is uniformly distributed throughout a cross sectional portion of said preformed thermoplastic pavement marking material.

9. The preformed thermoplastic pavement marking material of claim 1, wherein said taggant composition is visible under light magnification during and/or after illumination with UV light.

10. The preformed thermoplastic pavement marking material of claim 1, wherein said taggant composition is impregnated with 0.5 to 10 weight percent titanium dioxide.

* * * * *